United States Patent [19]

Smith et al.

[11] Patent Number: 4,881,247
[45] Date of Patent: Nov. 14, 1989

[54] MEASURING NUCLEAR FUEL BURNUP

[75] Inventors: Richard C. Smith, O'Hara Township, Allegheny County; John Bartko, Monroeville; Arnold H. Fero, Plum Borough, all of Pa.

[73] Assignee: Westinghouse Electric Corp., Pittsburgh, Pa.

[21] Appl. No.: 325,016

[22] Filed: Mar. 16, 1989

Related U.S. Application Data

[63] Continuation of Ser. No. 91,359, Aug. 28, 1987, abandoned, which is a continuation of Ser. No. 362,005, Mar. 25, 1982, abandoned.

[51] Int. Cl.⁴ .............................................. G21C 17/00
[52] U.S. Cl. ...................................................... 376/257
[58] Field of Search ................ 376/257, 153, 154, 254, 376/255; 250/390-392

[56] References Cited

U.S. PATENT DOCUMENTS

| | | | |
|---|---|---|---|
| 3,776,813 | 12/1973 | Corno | 376/257 |
| 4,123,328 | 10/1978 | Radkowsky et al. | 376/350 |
| 4,201,912 | 5/1980 | Evans et al. | 376/154 |
| 4,325,785 | 4/1982 | Klotz et al. | 376/257 |

FOREIGN PATENT DOCUMENTS

| | | | |
|---|---|---|---|
| 53-22993 | 3/1978 | Japan | 376/257 |
| 54-151795 | 11/1979 | Japan | 376/257 |

OTHER PUBLICATIONS

ORNL-4628 (5/73) "Origen-The ORNL Isotope Generation and Depletion Code" Bell Introduction to Health Physics Pergamow Press (1969) Cember pp. 260-261.

Primary Examiner—Salvatore Cangialosi
Attorney, Agent, or Firm—Joyce L. Morrison; R. D. Fuerle; Alex Mich, Jr.

[57] ABSTRACT

Disclosed is a method and apparatus for measuring the burnup of nuclear fuel. A curve giving the calculated relationship between the fast neutron emission rate and the burnup of fuel is prepared. The fast neutron counting rate from a sample of nuclear fuel of known burnup is measured and the proportionality ratio between that measurement and the fast neutron emission given by the curve for the same burnup is determined. The fast neutron counting rate of nuclear fuel of unknown burnup is then measured and multiplied by the proportionality ratio to determine the fast neutron emission rate, from which the unknown burnup is then determined by means of the curve.

18 Claims, 2 Drawing Sheets

MEASURING NUCLEAR FUEL BURNUP

This application is a continuation of application Ser. No. 07/09,359 filed Aug. 28, 1987, now abandoned, which is a continuation of application Ser. No. 07/362,005 filed Mar. 25, 1982, now abandoned.

BACKGROUND OF THE INVENTION

Light water nuclear power plants have on-site, underwater, spent-fuel storage pits, for the purpose of storing spent fuel (i.e., high burnup fuel) until the most intense heat and radioactivity have dissipated. Industry planners had anticipated that the spent fuel would then be transported to a reprocessing plant where unburned $^{235}$U and plutonium generated through neutron capture by $^{238}$U would be recovered and used to make new fuel.

However, in the late 1970's, two U.S. Government policies were initiated which necessitated changes in this process. The first policy prohibited the recovery of $^{235}$U and plutonium from the spent fuel. The result, according to subsequent analysis of the costs involved, was that the most economical concentration of $^{235}$U in fuel rods increased from about 3% to about 4.5% (all percentages herein are by weight). That is, natural uranium contains only 0.72% of the fissionable $^{235}$U isotope. The enrichment of natural uranium to higher percentages of the $^{235}$U isotope is necessary for the operation of light water reactors. With a nuclear power plant, the amount of energy one can extract from the fuel and convert to electricity increases with the amount of enrichment. However, enrichment is expensive, and costs increase as the percent enrichment increases. If the $^{235}$U and plutonium could be recovered from the spent fuel rods, these competing considerations result in a minimum cost at about 3% $^{235}$U in the fuel rods, which is the value used at present. However, if the valuable $^{235}$U and plutonium are not allowed to be recovered from the spent fuel, the minimum cost rises and is achieved at about 4.5% $^{235}$U in the nuclear fuel.

When the spent fuel is stored in the spent fuel pits, the Nuclear Regulatory Commission requires that the distance between the spent fuel rod bundles (fuel assemblies) be sufficient to prevent the initiation of a chain reaction. This distance is calculated as though the fuel were new since it has up to now been impractical to determine to what degree the fuel has been spent. Thus, if the percentage of $^{235}$U in the fuel is increased from 3% to about 4.5% to minimize costs under the new rules, the distance between the fuel assemblies in the spent fuel pits will need to be increased. But because the fuel assemblies are stored in racks made for 3% fuel, the 4½% assemblies will need to be stored in every other space, a larger spacing than would be necessary to prevent a chain reaction even if the 4½% fuel were new. Thus, the storage space in the fuel pits is considerably reduced.

The second new government policy prohibited the removal of the spent fuel assemblies from the pits. Thus, with the 4½% fuel, not only will the distance between the assemblies be greater than for 3% fuel, but the accumulation of the spent fuel assemblies in the pits is rapidly depleting the storage space in the nuclear fuel plants.

This problem could be greatly alleviated if the amount of fissionable matter remaining in the fuel rods could be easily and accurately determined. If this could be accomplished, the fuel assemblies could be stored closer together in the pits as the distance between them could be based on the actual fissionable content in the rods rather than on the fissionable content that was present when they were new.

SUMMARY OF THE INVENTION

We have discovered an accurate, rapid, and inexpensive method and apparatus for measuring the burnup in nuclear fuel. Using our invention, the burnup of fuel in the assemblies removed from a nuclear reactor can be quickly and accurately determined so that the minimum safe distance between them in the fuel pits can be calculated. The use of our invention will greatly alleviate the problems of storing spent fuel in the spent fuel pits and will enable the nuclear reactors to continue operating.

DESCRIPTION OF THE PREFERRED EMBODIMENTS

As a nuclear power reactor operates, the quantity of fissionable material in the fuel rods decreases. The term "burnup" denotes this depletion of fissionable content. As burning occurs, certain radioactive isotopes are produced which spontaneously emit fast neutrons. The greater the burnup, the greater will be the production of these isotopes, and thus the emission rate of these fast neutrons will increase. There are five isotopes which account for more than 99% of a fuel assembly's fast neutron emission. These are $^{242}$Cm, $^{244}$Cm, $^{238}$Pu, $^{239}$Pu, and $^{240}$Pu. The plutonium isotopes dominate the emission up to about 200 effective full power days of reactor operation, at which point they count for 50% of the neutron activity. Thereafter, the curium isotopes become more important, account for 64%, 83%, 97%, and 99% after 210, 300, 600, and 900 effective full power days, respectively.

Figure 1:
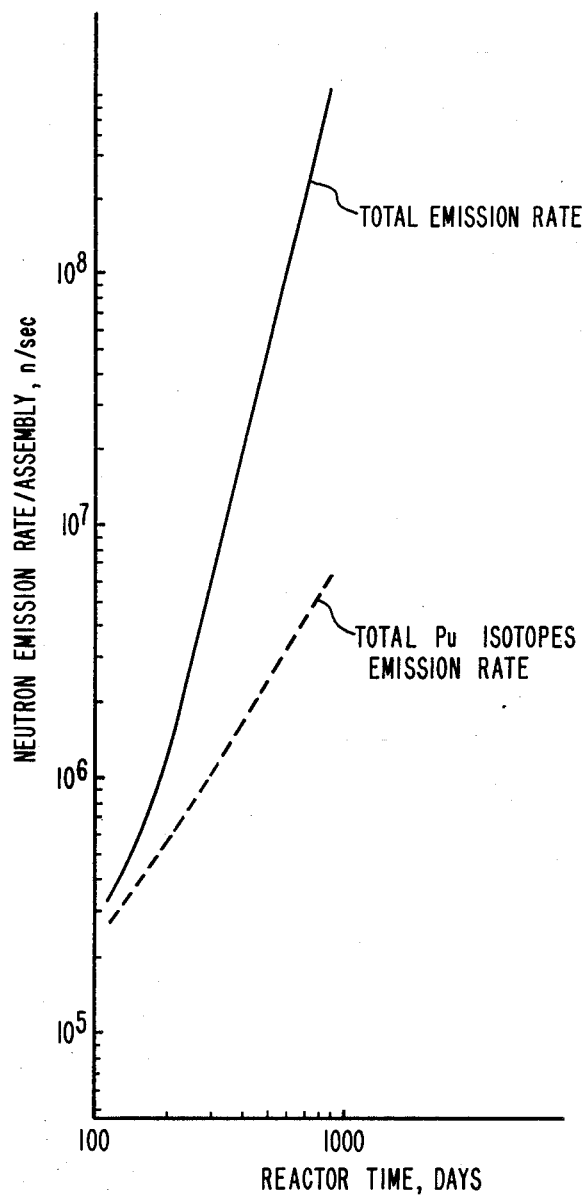
FIG. 1 is a chart giving the relationship between the emission of fast neutrons and the burnup of nuclear fuel.

FIG. 1 gives a typical relationship between the effective full power reactor days and the spontaneous neutron emission rate of an assembly that is assumed to have resided in the reactor for that length of time. The graph in FIG. 1 comes from calculations based on the method described in the publication *Origin—The ORNL Isotope Generation and Depletion Code*, by M. J. Bell, ORNL-4628, Oak Ridge National Laboratory, Oak Ridge, TN, May 1973. FIG. 1 corresponds to a reactor operating at a thermal power of 4100 MW, with an initial uranium enrichment of 3.20% $^{235}$U, with a total fuel load of 103.6 metric tons of uranium, divided among 193 fuel assemblies, and operating with an average thermal neutron flux of $4.26 \times 10^{13}$ n/(cm$^2$-s). It is the capture by $^{238}$U of these neutrons and the subsequent neutron capture by the thus newly formed isotopes that, together with the emission of beta particles, produce the neutron-emitting isotopes of curium and plutonium. The quantity of these isotopes produced depends almost entirely on the total number of thermal neutrons to which an assembly is exposed, as does the thermal energy released due to fission by the fuel in the assembly. The calculated curve shows a linear relationship between the neutron emission rate and the reactor exposure time. The calculated curve has a formula given by in $y = m \ln x \, b$ where y is the assembly neutron emission rate; x is the reactor exposure time and m and b are constants. The constants m and b are determined by normal procedures for fitting linear relationships, i.e. the x and y values are used for two points to determine the two unknowns. The values obtained were m=3.92 and −6.62. By inserting these values and taking the anti-logarithm of both sides, one obtains the following equation: Neutron emission rate (n/s)=$1.34 \times 10^{-3}$ [reactor exposure (days)]$^{3.92}$. This equation can be further modified to the following equation: reactor exposure=746.3 (emission rate)$^{-3.92}$. This equation would be employed to determine reactor exposure directly from the emission rate, which, in turn, is obtained from the measured neutron counts.

This invention is based on a measurement of this total neutron activity of an assembly and the correlation of that activity to the burnup of the fuel. We have also found that perturbations in fast neutron emission due to reactor down time are insignificant and err on the conservative side anyway.

Figure 2:
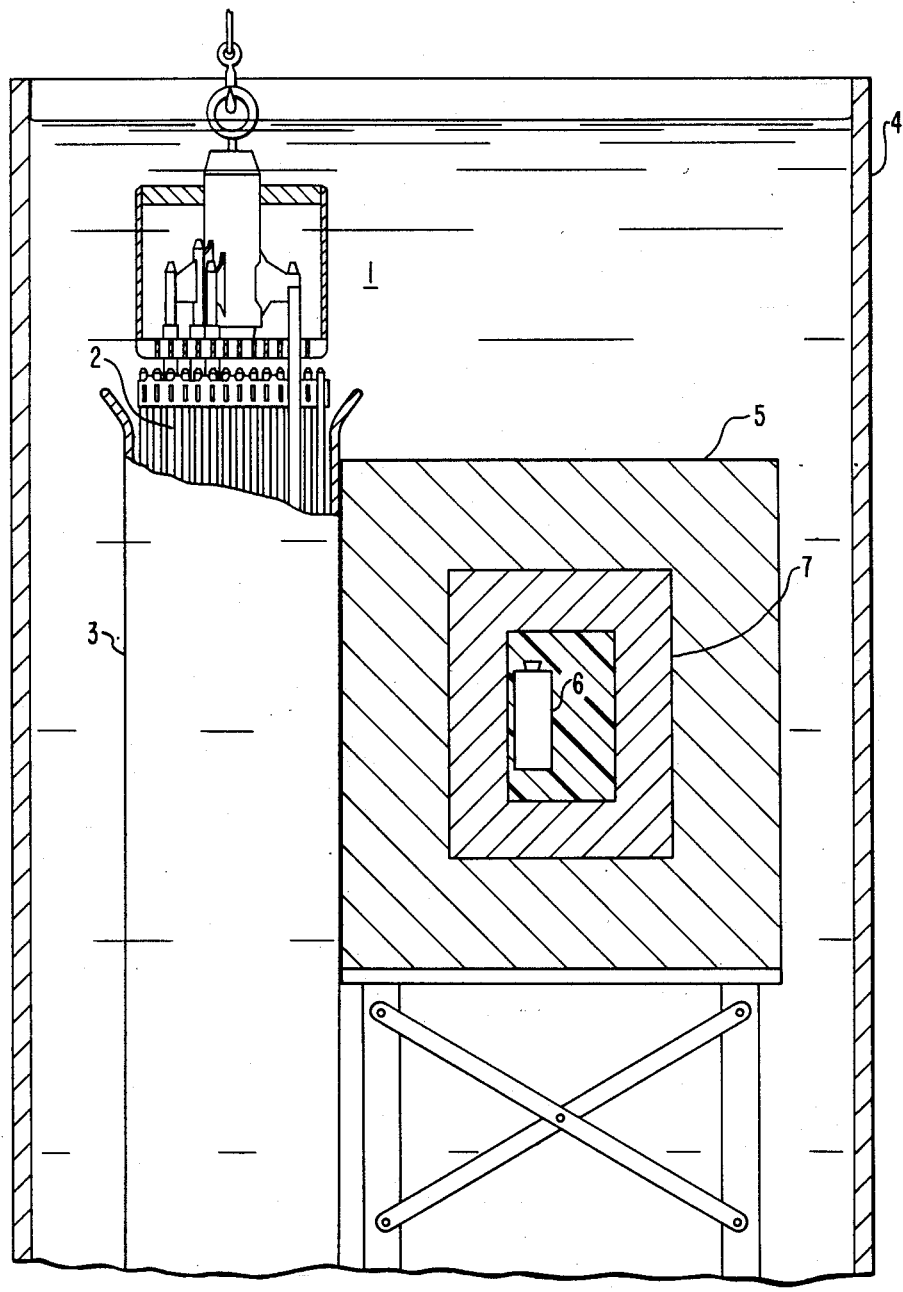
FIG. 2 is a side view of a certain presently preferred embodiment of the apparatus of this invention.

FIG. 2 illustrates the apparatus for measuring the fast neutron emission rate from spent fuel rods. In FIG. 2, a fuel rod assembly 1 containing fuel rods 2 is lowered into a positioning frame 3, such as a single element of a standard spent fuel storage rack. The frame, fuel rod assembly, and remaining apparatus are surrounded with water 4, which may or may not contain dissolved boron. Lead bricks 5 prevent gamma rays and some thermal neutrons from reaching neutron detector 6, and cadmium sheets 7 prevent any remaining thermal neutrons from reaching neutron counter 6. A polyethylene moderator 8 slows down the fast neutrons to the thermal energy range so as to activate neutron counter 6.

A certain fraction of the fast neutrons emitted by the spent fuel will interact with counter 6, each producing an electrical pulse. The counting rate of these pulses is directly proportional to the emission rate of fast neutrons from the assembly. Since there is a one-to-one correspondence between emission rate and burnup, there is also a one-to-one correspondence between counting rate and burnup.

The actual inventory buildup pattern of curium and plutonium in a fuel assembly will proceed at different rates for different reactor and fuel assembly designs but will be the same over the lifetime of a given reactor or for a given reactor design. As one step in the method of this invention, it is necessary to use the apparatus to measure the fast neutron counting rate from a nuclear fuel assembly of known burnup from a given type of reactor. The burnup of nuclear fuel can be determined by maintaining a careful history of the fuel in the reactor or by a chemical analysis. Either method is technically and economically prohibitive for use on large quantities of fuel, but is practical for a small sample. By dividing the neutron emission rate give from a calculated curve (such as in FIG. 1) by the coutning rate for a fuel sample having that reactor time, a proportionality constant between the emission rate from a sample of known burnup and the counting rate from samples of unknown burnup can be determined. When the neutron counting rate of nuclear fuel of unknown burnup is measured, multiplication by the proportionality constant will give the emission rate and, from the curve, the reactor time which is a measurement of the amount of burnup.

Examples of devices suitable for measuring neutron emissions via counting rate include a boron-10 lined neutron detector and a U-235 lined fission detector. The boron 10 detector is preferred because it is about 20 times more sensitive, although it is more affected by gamma rays and thus requires more lead shielding. Both of these types of detectors detect thermal neutrons, so it is necessary to surround the detector with water or polyethylene to change the fast neutrons to thermal neutrons. It is also necessary to exclude gamma rays from the detector by surrounding it with lead, which also excludes some of the thermal neutrons, and to exclude any remaining thermal neutrons by surrounding it with cadmium. In addition, the associated counting electroncis such as a power supply, amplifier, discriminator, and scaler are required as is well known in the art. The associated electronics are not located underwater, but at a location remote from the counter and fuel assembly, electrical connections being made with standard cables also well known in the art.

EXAMPLE 1

A test was conducted to determine roughly the sensitivity of the burnup measurement. The experimental arrangement was similar to that shown in FIG. 2. The detector was a two inch diameter by four inch long $BF_3$ neutron counter. Adjacent to the detection system was a simulated portion of a fuel assembly in a plexiglass tank. The rod spacing and geometry approximated those of a real assembly. For the test, ten simulated rods were fabricated, five containing eight enriched uranium fuel peelets (about 3%) and five containing eight fuel pellets of natural enrichment (0.72%). The total length of each stack of eight pellets was about 12 centimeters. They were housed in aluminum cylinders. A 5.2 microgram $^{252}Cf$ source (0.375 inch diameter by about 1 inch long) provided the fission spectrum of neutrons simulating emissions of the cirium and plutonium isotopes. The neutron emission rate was about 1.25 times $10^7$ neutrons per second. In the first series of runs, the five enriched rods were placed in the first row of a 5 by 5 grid and the five natural rods were placed in the second row. The source was then moved from the fifth row to the first row in the third column, displacing the fuel rods in rows 1 and 2. In the second series of tests, no fuel rods were used. Neutron count rates were measured and recorded during successive 10 second perios for the $^{252}Cf$ source in the five positions in the third column. All but two points of these series were repeated using a 2,000 ppm concentration of boron in the water. The results are given in the following table:

| Simulated Fuel Rods In Position | Boron Concentration In Water | CF-252 Source Position | | | | |
|---|---|---|---|---|---|---|
| | | Row 1 | Row 2 | Row 3 | Row 4 | Row 5 |
| Yes | 0 ppm | 17.5 | 14.4 | 11.2 | 8.5 | 6.3 |
| | 2000 ppm | 16.6 | 13.4 | 10.3 | — | — |
| No | 0 ppm | 15.6 | 12.1 | 8.8 | 6.2 | 4.5 |
| | 2000 ppm | 15.4 | 11.8 | 8.6 | 6.2 | 4.4 |

The highest counting rate waas obtained for the fuel rods in position in a water bath due to the reduced shielding because of the displaced water and to the additional fast neutrons of fission reactions in the fuel rodds. The addition of boron decreased the counting raate, but not appreciably. The decrease is due to primarily to the reduced number of thermal neutrons available for fission reactions in the fuel rods. Experiments show that the reduction in shielding due to the displaced water and the fission neutron production in the rods together cause only a 10% increase in the total counting rate. Also, since there is a negligibly small difference between count rates with pure waater and with borated water, the experiments indicaate that an insignificant number of thermal neutrons were able to penetrate the lead and cadmium shields. Accordingly, the apparatus is indeed sensitive to only the fast neutrons. All four experiments demonstrate that the counting rate drops rather sharply as the neutron source location moves farther into the assembly. Thus, in a practical application, the technique would be most sensitive to the burnup in the first few outside layers of rods. If there were any differences in burnup across the cross-sectional area of an assembly, it would be likely that the interior rods would have a higher burnup. In that sense, the application of the proposed method would provide conservative estimates of burnup. The fact that excellent counting rates were obtained using a relatively weak $^{252}$Cf source suggests that sizable counting rates would be obtained in a practical application.

EXAMPLE 2

This example illustrates how the burnup of a fuel assembly of unknown burnup would be calculated for a particular reactor design and initial uranium enrichment, given the curve shown in FIG. 1 and a reading of 161.9 counts per second when an assembly having a known burnup of 600 effective full power days was measured in an apparatus as illustrated in FIG. 2. Since the corresponding emission rate for the assembly of known burnup is $9.92 \times 10^7$ neutrons per second (from FIG. 1), the emission to-reading conversion factor is $9.92 \times 10^7 \div 161.9 = 6.13 \times 10^5$ emitted neutrons per neutron count. If the counting rate from an assembly of unknown burnup were then measured to be 812.4 counts per second, its emission rate would be obtained through multiplication by the conversion factor yielding $812.4 \times 6.13 \times 10^5 = 4.98 \times 10^8$ neutrons emitted per second. From the graph in FIG. 1, the unknown burnup corresponding to this emission rate is then determined to be 900 effective full power days.

We claim:

1. A method of measuring the burnup of nuclear fuel comprising:
   (A) measuring the fast neutron counting rate of said nuclear fuel;
   (B) reading said burnup off a curve which expresses the relationship between neutron emission rate and burnup for a nuclear fuel of comparable history, where the emission rate which corresponds to said neutron counting rate is obained by multiplying said neutron counting rate by the ratio of the neutron emission rate given by said curve for nuclear fuel of comparable history and known burnup to its similarly measured counting rate, and is defined by the formula $$n/s = 1.34 \times 10^{-3}3.92$$

where n/s equals neutron emission rate.

2. A method according to claim 1 including the additional step of calculating said curve.

3. A method according to claim 1 wherein said fast neutron counting rate is measured with a boron-10 lined neutron detector or a U-235 lined fission detector which is shielded from gamma rays by a gamma ray shiefd and from thermal neutrons by a thermal neutron shield, where a moderator which slows fast neutrons down to thermal neutrons is provided inbetween said detector and said thermal neutron shield.

4. A method accordinig to claim 3 wherein said moderator is selected from the group consisting of water, polyethylene, and mixtures thereof.

5. A method according to claim 3 wherein said gamma rays are shielded with lead.

6. A method according to claim 3 wherein said thermal neutrons are shielded with cadmium.

7. A method of measuring the burnup of nuclear fuel comprising:
   (A) measuring the fast neutron counting rate of said nuclear fuel;
   (B) obtaining the burnup which corresponds to said counting rate from a fast neutron counting rate-burnup curve which is a neutron emission rate-burnup curve, where the scale of said counting rate given by said fast neutron counting rate-burnup curve is the product of (1) the scale of the emission rate of said neutron emission rate-burnup curve for nuclear fuel of comparable history and (2) the ratio of a similarly measured neutron counting rate of nuclear fuel of comparable history and known burnup to its neutron emission rate as given by said neutron emission rate-burnup curve, and is defined by the formula $$n/s = 1.34 \times 10^{-3}3.92$$

where n/s equals neutron emission rate.

8. Apparatus for determining the burnup of nuclear fuel comprising:
   (A) means for measuring the fast neutron counting rate of said nuclear fuel;
   (B) a curve giving the relationship between said fasat neutron counting rate and burnup which is defined by the formula $$n/s = 1.34 \times 10^{-3}3.92$$

where n/s equals neutron emisson rate.

9. Apparatus according to claim 8 which includes a boron-10 lined neutron detector or a U-235 lined fission detector to measure said fast neutron counting rate, where said detector is provided with a gamma ray shield and a thermal neutron shield, and a moderator which slows fast neutrons down to thermal neutrons is positioned inbetween said detector and said thermal neutron shield.

10. Apparatus accordiing to claim 8 wherein said moderator is selected from the group consisting of water, polyethylene, and mixtures thereof.

11. Apparatus according to claim 9 wherein said gamma ray shield is lead.

12. Apparatus according to claim 9 wherein said thermal neutron shield is cadmium.

13. Apparatus for measuring the burnup of nuclear fuel comprising:
   (A) means for measuring the fast neutron counting rate of nuclear fuel;

(B) a sample of nuclear fuel of comparable history and known burnup, for which, when placed in said means for measuring fast neutron counting rate, a fast neutron counting rate is obtainable;

(C) a neutron emission rate-burnup curve giving the relationship between neutron emission rate and burnup, from which the neutron emission rate of said sample is obtainable, and the ratio of said neutron emission rate to said neutron counting rate of said sample is determinable, so that when said nuclear fuel is placed in said means for measuring fast neutron counting rate and is fast neutron counting rate is measured, its fast neutron counting rate can be multiplied by said ratio to give its neutron emission rate and the burnup of said nuclear fuel can be read off said neutron emission rate-burnup curve, said curve being defined by the formula $$n/s = 1.34 \times 10^{-3} 3.92$$

where N/S equals neutron emission rate.

14. Apparatus according to claim 13 which includes a boron-10 lined neutron detector or a U-235 lined fission detector to measure said fast neutron counting rate, where said detector is provided with a gamma ray shield and a thermal neutron shieldd, and a moderator which slows fast neutrons down to thermal neutrons is positioned in between said detector and said thermal neutron shield.

15. Apparatus according to claim 14 wherein said moderator is selected from the group consisting of water, polyethylene, and mixtures thereof.

16. Apparatus according to claim 14 wherein said gamma ray shield is lead.

17. Apparatus according to claim 14 where said thermal neutron shield is cadmium.

18. Apparatus according to claim 8 wherein the scale of said fast neutron counting rate given by said curve is the product of the scale of the neutron emission rate of a neutron emission rate-burnup curve times the ratio of a similarly measured fast neutron couning rate of nuclear fuel of known burnup and comparable history to its neutron emission rate as given by said neutron emission rate-burnup curve.

* * * * *